United States Patent
Wu et al.

(10) Patent No.: US 7,184,175 B2
(45) Date of Patent: Feb. 27, 2007

(54) SYSTEM AND METHOD FOR COLOR CALIBRATION

(75) Inventors: Yifeng Wu, Vancouver, WA (US); Philip B Cowan, Vancouver, WA (US); David Kinkley, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1002 days.

(21) Appl. No.: 10/231,572

(22) Filed: Aug. 29, 2002

(65) Prior Publication Data

US 2004/0042021 A1 Mar. 4, 2004

(51) Int. Cl.
*H04N 1/50* (2006.01)
*H04N 1/60* (2006.01)

(52) U.S. Cl. .................. 358/1.9; 358/504; 358/523

(58) Field of Classification Search ................ 358/1.9, 358/504, 518, 523; 356/404–408
See application file for complete search history.

(56) References Cited

U.S. PATENT DOCUMENTS

| | | | |
|---|---|---|---|
| 3,529,519 A | 9/1970 | Mitchell | |
| 3,718,397 A | 2/1973 | Smajo | |
| 3,799,668 A | 3/1974 | McVeigh | |
| 4,310,248 A | 1/1982 | Meredith | |
| 4,687,334 A * | 8/1987 | Miyakawa | 356/404 |
| 5,598,272 A | 1/1997 | Fisch et al. | |
| 5,604,567 A | 2/1997 | Dundas et al. | |
| 5,809,366 A | 9/1998 | Yamakawa et al. | |
| 5,995,714 A | 11/1999 | Hadley et al. | |
| 6,030,066 A | 2/2000 | Li et al. | |
| 6,215,562 B1 | 4/2001 | Michel et al. | |
| 6,219,155 B1 | 4/2001 | Zuber | |
| 6,268,932 B1 | 7/2001 | Lee et al. | |

FOREIGN PATENT DOCUMENTS

| | | |
|---|---|---|
| EP | 0 613 062 | 11/1996 |
| EP | 0 685 962 | 8/2000 |

* cited by examiner

*Primary Examiner*—Scott A. Rogers

(57) ABSTRACT

A method of detecting color miscalibration in a color output device. Accordingly, the method includes providing a calibration mask having a target color and a plurality of windows, and outputting a test array that includes a plurality of test samples arranged for viewing through the windows of the calibration mask, wherein each test sample has an associated test color. The windows may be at least partially aligned with at least one of the test samples, and the target color of the calibration mask may be compared to the test colors of the framed test samples.

26 Claims, 3 Drawing Sheets

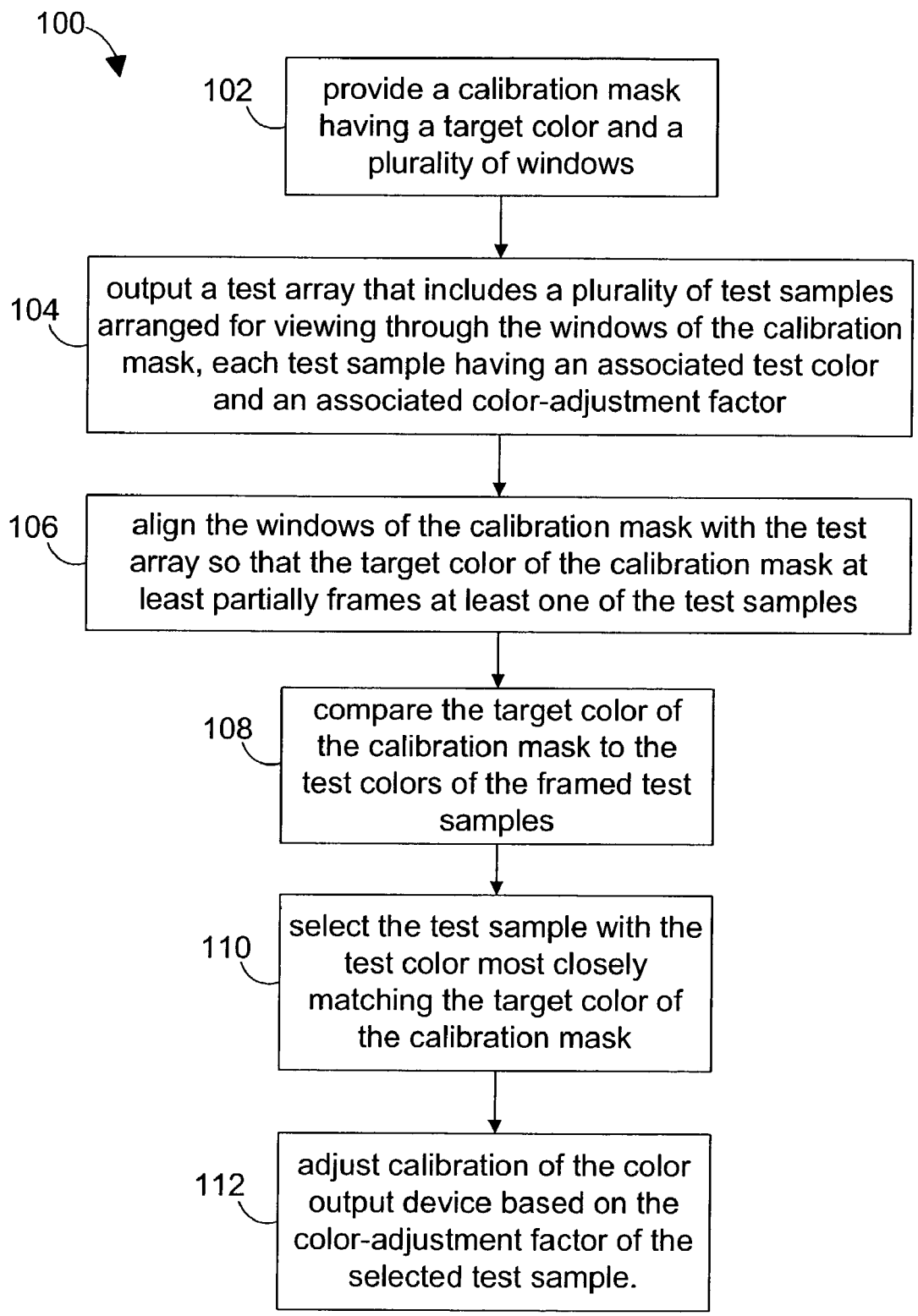

SYSTEM AND METHOD FOR COLOR CALIBRATION

BACKGROUND

Producing accurate color with a printer or display can be difficult. In particular, it may be difficult to calibrate printers that combine inks of different colors to produce various other colors. If too much or too little ink of one color is added to the combination, the hue of the desired color may not be accurate. Therefore, anything that alters the delivery of any particular ink, such as temperature, humidity, ink drop size, or variance in ink composition, may cause the resulting color to be inaccurate.

One solution is to implement an automatic calibration procedure in which printed output is detected by a color sensor and analyzed for color accuracy. This method may not be appropriate in some circumstances because the resulting calibration may not produce the desired results. In particular, the preferences of an individual may not be accounted for by automatic calibration procedures.

Another solution is to implement a manual calibration procedure in which adjustments to a printer are made based on an observer's opinion of the overall hue of a printer's color output. An observer may notice that color output from a printer is inaccurate, and consequently reconfigure the printer to correct the color inaccuracy. However, using this method it may be difficult for an observer to accurately make determinations about the direction and magnitude of the hue shift.

SUMMARY

A method of detecting color miscalibration in a color output device is provided. Accordingly, the method includes providing a calibration mask having a target color and a plurality of windows, and outputting a test array that includes a plurality of test samples arranged for viewing through the windows of the calibration mask, wherein each test sample has an associated test color. The windows may be at least partially aligned with at least one of the test samples, and the target color of the calibration mask may be compared to the test colors of the framed test samples.

BRIEF DESCRIPTION OF THE DRAWINGS

FIG. 7 is a flowchart demonstrating a method of detecting color miscalibration in a color output device.

DETAILED DESCRIPTION

Figure 1:
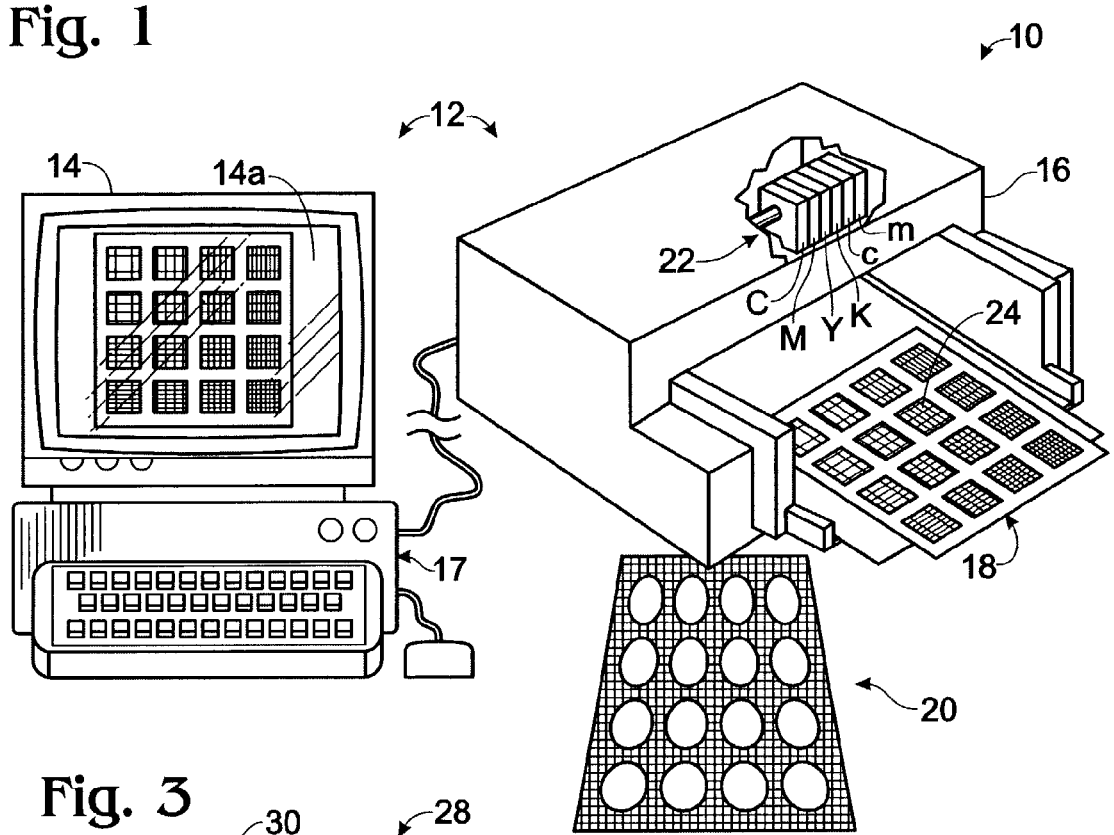
FIG. 1 is a color calibration system including a calibration mask configured to facilitate color calibration of a color output device in accordance with an embodiment of the invention.

FIG. 1 shows an exemplary color calibration system 10. Color calibration system 10 may include one or more color output devices 12, such as display 14 or printer 16. The color output devices typically are configured to present color information to a user. For example, display 14 may be configured to display color images on a viewing area 14a, and printer 16 may be configured to print color images onto a presentation medium 18. For simplicity, the present disclosure will be made in the context of a printer such as printer 16, but it should be appreciated that the present invention is not so limited.

As indicated, printer 16 may include a color-output assembly 22 including a plurality of color output units, such as pens of an inkjet printer. Each pen is configured to print a constituent color that may blend with other constituent colors to yield a variety of mixed colors. For example, printer 16 may include a dark cyan (C) pen, dark magenta (M) pen, yellow (Y) pen, black (K) pen, light cyan (c) pen, and light magenta (m) pen to collectively form a CMYKcm color-output assembly 22. Although pens are illustrated herein, it will be appreciated that the color output units may be toner dispensing assemblies of a laser printer, display cells, etc. It also should be understood that the individual color output units may be physically separated or integrated with other color output units. For example, cyan, magenta, and yellow, inkjet pens may be combined in a single cartridge or reside in three separate cartridges. Furthermore, any number of colors may make up the constituent colors. Accordingly, the constituent colors may consist of only cyan, magenta, yellow, and black (CMYK), or alternatively, of red, green, and blue (RGB).

As shown in FIG. 1, printer 16 may be configured to print a test array 24 onto presentation medium 18. Such printing may occur upon receiving corresponding printing instructions from a computing device 17. The printing instructions typically include directives to print (or otherwise present) a color described in a device-dependent color space, such as the CMYK color space. Colors described in a device-dependent color space may be derived from colors described in a device-independent color space via a color conversion table. For example, colors described in CIELAB space may be converted to CMYK space. The conversion may be executed by a processor of printer 16, a processor of an external computing device 17, or another suitable processor.

CIELAB space, or more properly, 1976 CIE L*a*b* space, is a color space with the coordinates L*, a*, and b*. The central vertical axis (L*), also referred to as the neutral axis, represents lightness, with values from 0 (black) to 100 (white). The two chrominance axes each run from positive to negative. On the a–a' axis (a*), positive values indicate amounts of red while negative values indicate amounts of green. On the b–b' axis (b*), yellow is positive, and blue is negative. For both the a–a' axis and the b–b' axis, zero is neutral. A single specific color can be uniquely identified with a value for each chrominance axis, and a luminance value of the central vertical axis. CIELAB space is one example of many possible device-independent color space that may be used to describe a color.

A CMYK printing system, for example, may print a desired color by mapping a color described in CIELAB space (or virtually any other device-independent color space) to a color described in CMYK space. Such color mapping typically includes using a color conversion table to transform a selected point in CIELAB space to a particular point in CMYK space. The description of the color in CMYK space typically corresponds to the amount of cyan, magenta, yellow, and black colorant, as well as the relative pattern and position of each colorant, required to generate the particular color on a particular device. The color conversion of device-independent color to device-dependent color typically takes into account certain physical constraints of the color output device (for example ink drop size, ink density, ink behavior on the printing substrate, half toning method, etc.).

Printer 16 typically produces color output by blending constituent colors (CMYK) according to a color conversion table to yield mixed colors. The printer may blend such constituent colors by printing dots of one constituent color amongst dots of another constituent color to form a mixed color. The hue of the mixed color may be selected by controlling the number and placement of the dots of the respective constituent colors (as typically defined by the color conversion table). For example, a red sample may be printed by intermingling magenta and yellow dots in approximately equal portions. The magenta and yellow dots may or may not physically overlay one another. When the printer is properly calibrated, that is the color conversion table properly converts a color described in a device-independent color space to the same color in a device-dependent color space, the color output of a device will mimic the desired colors as described in device-independent color space.

A neutral color may be produced by blending the proper portions of cyan, magenta, yellow, and black in the proper pattern. A neutral color typically ranges from white to black, but does not express any constituent color over another ($a^*=b^*=0$). In producing a neutral color the relative amount of each constituent ink may be different than or the same as the amount of the other inks, depending on many factors such as the type of ink, the presentation medium, or the particular neutral color being printed. A printer's neutral axis is misaligned when the printer attempts to print a neutral color, but the resulting color output is shifted towards one or more of the constituent colors ($a^*\neq 0$ and/or $b^*\neq 0$). When a printer's neutral axis is misaligned, the printer typically undesirably prints with a color shift.

A printer's neutral axis may be realigned by making adjustments to the printer's color-calibration table. As described below, the color-calibration table may be adjusted by first determining in what direction and to what magnitude the neutral axis is misaligned, and then making adjustments to compensate for the misalignment. In order to make such a determination, a calibration mask 20, which has a known color, may be used as a reference to which test samples of a test array 24 may be compared.

Figure 2:
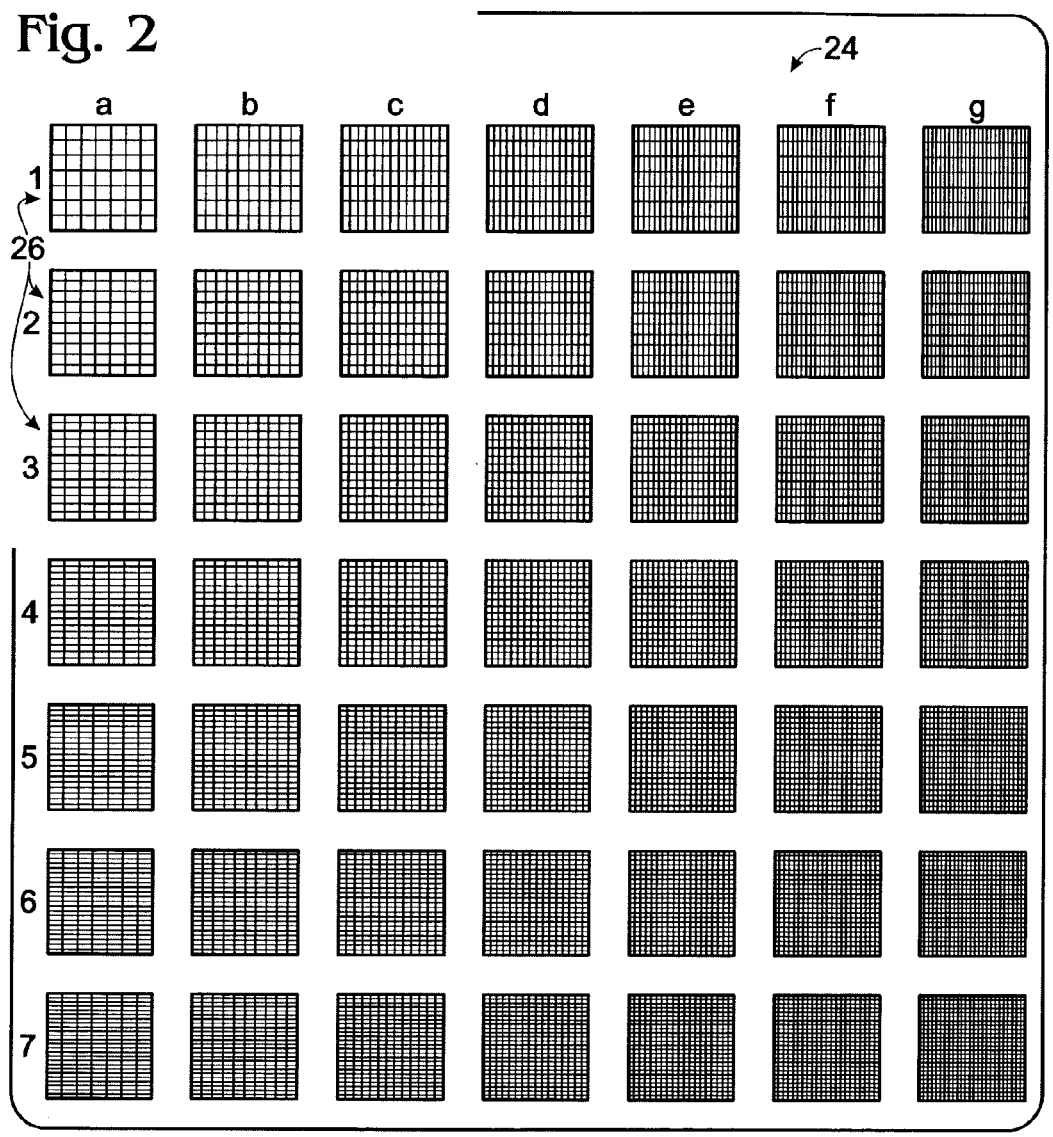
FIG. 2 shows a test array including a plurality of test samples produced with a color output device by mixing constituent colors in scaled combinations.

FIG. 2 shows test array 24, which may be produced on presentation medium 18. Test array 24 may include a plurality of test samples 26. For illustrative purposes, vertical lines in the test samples may represent the color magenta, with a greater number of vertical lines representing increased levels of magenta. Similarly, horizontal lines in the test samples may represent the color cyan, with a greater number of horizontal lines representing increased levels of cyan. Although the colors yellow and black are not indicated, it should be understood that yellow and black typically are used in combination with cyan and magenta, but are held constant in each test sample. Satisfactory calibration may be achieved while holding yellow constant because the human eye is less sensitive to differing amounts of yellow compared to differing amounts of cyan or magenta. Similarly, slight variations in black have a relatively less noticeable effect, in part because black is close to neutral.

In test array 24, the test samples may be arranged in a two-dimensional array, such as in rows and columns. It should be understood, however, that other arrangements may be used. For example, the test samples may be arranged linearly or radially. Test array 24 may include either more or fewer test samples, depending on the level of accuracy desired.

Each test sample typically has a test color that is determined by the combination of constituent colors used to print the test sample. As discussed above, the constituent colors may blend in various combinations to yield various mixed colors. The hue of the test colors may be scaled relative one another by varying the amount of one constituent color across a first dimension of the two-dimensional array, and varying the amount of a second constituent color across a second dimension of the two-dimensional array.

For example, the test sample in the centermost position, designated 26(d,4), may be printed to be a presumed-neutral test color. When the color output device is properly color-calibrated, the presumed-neutral test color will be an actual neutral color that does not express any constituent color over another ($a^*=b^*=0$). If the color output device is miscalibrated, the presumed-neutral test color may express one or more of the constituent colors over another constituent color. The presumed-neutral test color may be produced by combining the constituent colors in respective amounts thought to yield a neutral color. For descriptive purposes, this color may be described as ($C_0$+0s, $M_0$+0s, $Y_0$+0s, $K_0$+0s), where $C_0$, $M_0$, $Y_0$, and $K_0$ represent respectively constant amounts of the constituent colors, and s represents an incremental amount of colorant that may be added to or subtracted from a constituent color for a particular test sample. When compared to each other, the amount of relative colorant used for each constituent color may be the same ($C_0=M_0=Y_0=K_0$), or more or less colorant may be used for one or more of the constituent colors. In the case of the presumed-neutral test color, no colorant is added or subtracted from any of the constituent colors (0s).

The test color of the test samples around the centermost position may be scaled relative the presumed-neutral test color of the centermost position. For example, all test samples in the (e) column may include ($M_0$+1s) magenta colorant, which is 1s more than all the test samples in the (d) column. Each column further to the right may include successively more magenta ($M_0$+2s, $M_0$+3s, etc.). Each column to the left of the centermost column may include successively less magenta ($M_0$–1s, $M_0$–2s, $M_0$–3s, etc.). Similarly, the amount of cyan ink may be successively increased in rows above the centermost row ($C_0$+1s, $C_0$+2s, $C_0$+3s, etc.), and successively decreased in rows below the centermost row ($C_0$–1s, $C_0$–2s, $C_0$–3s, etc.). The degree of variance from row to row or column to column may be equal, as indicated above, or may alternatively be different. For example, the degree of variance may increase or decrease with each step away from the presumed-neutral test color.

Increasing the size of the test array increases the number of possible test colors, and thus, may allow the magnitude of each color step (1s) to be decreased while achieving the same overall range of color variation. As described herein, the test array may be used to calibrate a color output device, and slighter color changes between test samples increases the potential accuracy of the calibration. However, if the change is too slight, a human observer may not be able to appreciate the change. In particular, previously conducted tests have shown that some human observers may not appreciate a difference in color when $\Delta e=$ $\sqrt{(\Delta L^{*2}+\Delta a^{*2}+\Delta b^{*2})}<1$. Therefore, color changes in which $\Delta e \geq 1$ are acceptable in most circumstances, however, it is within the scope of the invention to make changes in which $\Delta e<1$. The human eye typically is less sensitive to changes in yellow compared to changes in cyan or magenta. However, the present invention may be used to calibrate yellow color output as well as cyan or magenta output. Although changes in the amount of yellow colorant may be difficult to appreciate, yellow colorant may be varied in a supplementary test array configured to calibrate yellow. As described below, a calibration mask may be used to more easily appreciate slight color differences, including differences such as those resulting from scaling the amount of yellow colorant used to produce the test samples.

For each printed test array, the test sample with a test color closest to the tested neutral color may be identified and used to color-calibrate a color output device. That test sample typically has an associated adjustment factor that corresponds to the variance in colorant used to produce that test sample compared to the test sample printed the presumed-neutral test color (usually the test sample in the centermost position). For example, relative to the presumed-neutral test color of test sample 26 (d,4), test sample 26 (a,1) is created by respectively reducing the amount of cyan and magenta colorant by three steps (3s) to yield a ($C_0$–3s, $M_0$–3s, $Y_0$+0s, $K_0$+0s) test sample. The associated adjustment factor for that test sample is (–3s, –3s, +0s, +0s). If that sample is selected as having a test color closest to the tested neutral color, the color conversion table may be altered so that 3s less cyan and 3s less magenta is used to print the presumed-neutral test color. Similar alterations may be interpolated throughout all or a portion of the color conversion table. In this manner, if a second test array is printed after the adjustment to the color conversion table is made, the test sample in the centermost position of the new test array may have a test color equal to the test color that previously belonged to the 26 (a,1) test sample.

A plurality of test arrays may be printed, each with a presumed-neutral test color aimed towards a different point (the tested neutral color) along the neutral axis. For example, plural test arrays may be printed with test samples from each test array (usually the centermost test sample of each test array) intended to respectively be L*=20, L*=40, L*=60, and L*=80 (or some other preselected values). For each test array, one or more of the constituent colors may be varied so that each test array provides a plurality of test samples with test colors scaled around the presumed-neutral test color for that test array. The test sample that appears to most closely match the tested neutral color may be chosen for each test array and used to locally calibrate the color conversion table around the tested points, such as L*=20, L*=40, L*=60, and L*=80 where a*=0 and b*=0. The local calibrations may be interpolated across a portion of the color conversion table, such as the entire neutral axis (0≦L*≦100) portion or even the entire color conversion table. The interpolation may be executed by printer 16, external computing device 17, or virtually any other capable mechanism. The above described calibration is an example, and other test arrays may alternatively or additionally be used to calibrate the color conversion table around different neutral colors.

Figure 3:
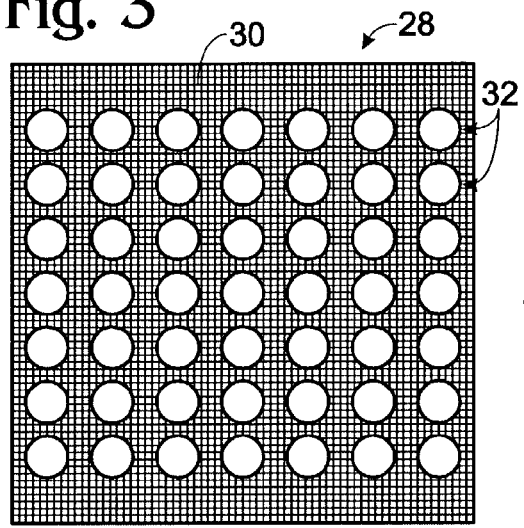
FIG. 3 shows a calibration mask configured to be used in combination with the test array of FIG. 2 in order to detect color miscalibration in a color output device in accordance with an embodiment of the invention.

FIG. 3 shows a calibration mask 28 configured to assist in accurately selecting the test sample with the test color closest to a neutral color. Calibration mask 28 typically includes a thin sheet 30 and a plurality of windows 32. The sheet may be made from the same material as presentation medium 18, or from some other material. Making sheet 30 out of the same material as presentation medium 18, however, helps standardize the way color is displayed on the sheet and the presentation medium so that an output color may appear the same on both the calibration mask and the presentation medium. Therefore, for color output devices such as photographic printers, photo media may be used for both sheet 30 and presentation medium 18. The materials from which sheet 30 and presentation medium 18 are made typically should promote little to no metamerism between colors printed on sheet 30 and presentation medium 18. In other words, the particular lighting and/or viewing conditions should not substantially influence the way colors relatively appear on the mask and the presentation medium. It is also typically desirable to select material that will promote printed colors having a long light fastness so that colors printed thereon will not significantly change over time.

Sheet 30 typically has a target color along the neutral axis (a*=0 and b*=0). The neutral target color may be produced by reliably combining proper amounts of constituent colors in the proper pattern to yield a neutral color. Ideally, the target color may be produced with the same type of ink, toner, or other colorant that is used to print test arrays and other output. In this manner, metamerism between the target color and the test colors of a test array may be reduced so that particular lighting and/or viewing conditions do not substantially influence the relative appearance of the produced colors. The colorant used to produce the target color also desirably has a long light fastness.

The target color may be used as a color-comparison reference for test colors of the test array. In particular, a mask with a target color equal to the tested neutral color of a given test array may be used to select the test sample with the test color that most closely matches the tested neutral color. The target color provides a reliable reference to which the test colors may be compared, which accordingly increases the overall accuracy of a color calibration procedure.

Figure 4:
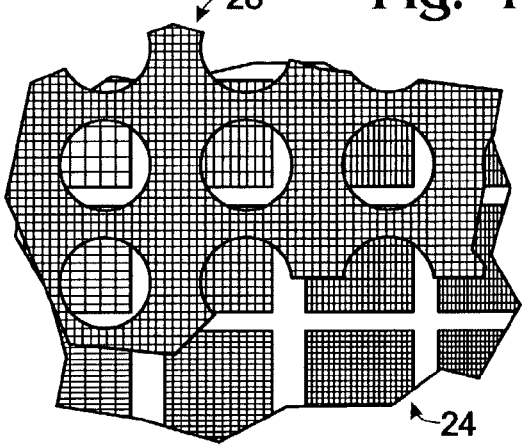
FIG. 4 is a top view of a calibration mask being aligned with a test array during color calibration.

The windows of the calibration mask typically are each configured to frame a test sample of test array 24 so that a side by side comparison of the calibration mask's target color may be made with the test color of each test sample. By configuring the mask so that each test sample may be simultaneously framed by a window, the target color may be directly compared in a side-by-side manner with numerous test colors. FIG. 4 shows the calibration mask being positioned over the test array in order to facilitate such a comparison. Comparing numerous test colors to the target color simultaneously, or near simultaneously, typically increases the ease by which subtle differences between the various test colors may be appreciated. Accordingly, the test color most closely matching the target color may be more accurately identified, and the resulting effectiveness of the color calibration may increase. It should be understood that the calibration mask may include one window for every printed test sample, or may alternatively include either more or fewer windows.

Figure 5:
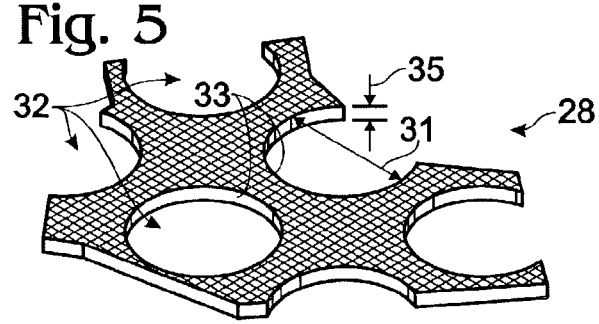
FIG. 5 is an isometric cutaway view of a portion of a calibration mask.

FIG. 5 shows an isometric cut away of calibration mask 28. Windows 32 of the calibration mask are typically configured so that each window frames a test sample along the window's entire perimeter. Therefore, the windows are typically smaller than the test samples. However, windows configured with too small a viewing area may make it difficult to fully appreciate the test color when viewing the test color through the window. It has been found that windows with a viewing area 31 of approximately one square centimeter are appropriate in most circumstances, although smaller or larger windows may be used. Each window typically has a border 33 that does not distract from a color comparison between the target color of the calibration mask and the test color of the aligned test sample. It has been found that thinner calibration masks result in less noticeable and distracting borders. The calibration mask may be any reasonable thickness 35, but it has been found that the thickness of typical photographic paper (approximately 0.6 millimeters or less) is appropriate in most circumstances.

Figure 6:
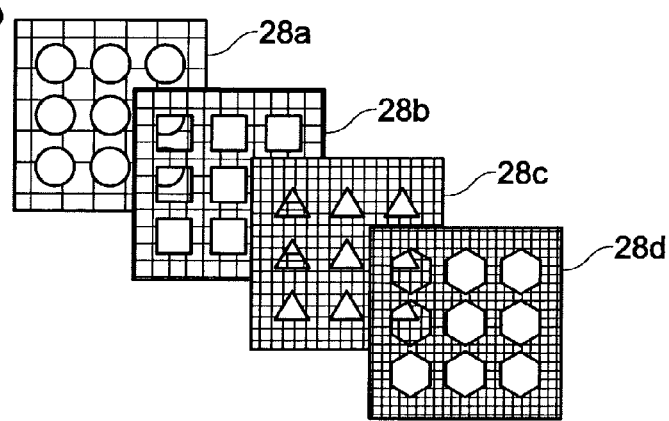
FIG. 6 shows a plurality of calibration masks, each configured to be used with a different test array in order to detect color miscalibration relative various colors.

FIG. 6 shows a plurality of calibration masks 28a, 28b, 28c, and 28d. Each mask may be similarly configured except for the mask's target color and/or window shape. In FIG. 6, each mask has a target color at a different point along the neutral axis. A set of such masks may be used to calibrate a color output device at plural points along the neutral axis. As described herein, the results from such calibrations may be interpolated over the color output device's entire range of color output or a portion thereof. While the above description has used a neutral color as a calibration point, it should be understood that color calibrations may be performed using other colors, and calibration masks may be configured to facilitate such calibrations. For example, calibrations may be performed around one or more skin tones, or around specific colors such as green for a particular grass, or blue for a particular sky.

FIG. 7 shows, generally at 100, a method of detecting color miscalibration in a color output device. Method 100 typically includes, at 102, providing a calibration mask having a target color and a plurality of windows. As described above, the target color may be a neutral color that is produced by blending a combination of constituent colors, such as cyan, magenta, yellow, and black. The windows of the mask may be configured to individually frame test samples of a test array, and may be virtually any geometric shape. The same material is typically used to make the calibration mask and the presentation medium configured to receive the color output device's color output.

The method typically further includes, at 104, outputting a test array that includes a plurality of test samples arranged for viewing through the windows of the calibration mask, each test sample having an associated test color and an associated color-adjustment factor. Outputting typically includes printing from an inkjet, laser, or other printer, but may also included displaying on a monitor or other output device. Each test sample is typically produced by blending a plurality of constituent colors to yield the test color for that test sample.

As described above, the test colors of the individual test samples may be scaled relative one another. The test samples may be arranged in a two-dimensional array that corresponds to the windows of the calibration mask, such as an array described by rows and columns. One constituent color may be varied across one dimension of the array while another constituent color is varied across another dimension of the array. The amount of variance for each test color may be measured from a presumed-neutral test color, and such variance from the presumed-neutral test color may be described as the color-adjustment factor for each test sample.

At 106, the method typically further includes aligning the windows of the calibration mask with the test array so that the target color of the calibration mask at least partially frames at least one of the test samples. As described above, the test array may be output so that the position of each test sample corresponds to a window of the calibration mask. Each window is typically configured to substantially frame, if not completely frame, a test sample so that the test sample may be viewed through the window. The test color of a test sample typically borders the target color of the calibration mask all the way around the perimeter of each window because each window is typically smaller in area than its respective test sample. Typically, each window of the calibration mask corresponds to a test sample, however, it is within the scope of the invention to align the mask when each window does not have a corresponding test sample.

The method typically further includes, at 108, comparing the target color of the calibration mask to the test colors of the framed test samples. Because the windows are typically configured to frame the test samples, the test color of each test sample may be compared in a side-by-side fashion to the target color of the calibration mask. If the test color that is a presumed-neutral test color matches the calibration mask, the color output device is correctly color-calibrated. If the target color does not match the presumed-neutral test color, the color output device needs color calibration. It may be best to wait a period of time before comparing the target color to the test colors because the colors may shift after printing. It may be useful to use a dryer to facilitate setting the test colors. Of course, the comparison only need be made to the extent necessary to calibrate the color output device. In some instances, as few as one test samples may be compared.

At 110, the method may further include selecting the test sample with the test color most closely matching the target color of the calibration mask. The target color of the calibration mask provides a color-comparison reference that assists in making such a selection. If a test sample expresses a constituent color ($a^* \neq 0$ and/or $b^* \neq 0$), the expression typically will be more apparent when the test color is framed by the target color that does not express any constituent color over another ($a^*=b^*=0$). Because the windows allow simultaneous, or near simultaneous, comparisons between various test colors and the target color, subtle differences may be appreciated.

The method may further include, at 112, adjusting calibration of the color output device based on the color-adjustment factor of the selected test sample. The color-adjustment factor typically indicates the magnitude and the direction of the color output device's miscalibration, and may be used as a guide to calibrate the device. The adjustment may include adjusting a color conversion table, and the adjustment may be interpolated throughout a range of the color conversion table. Adjusting the color conversion table typically causes more or less of at least one constituent color to be applied when producing color output of a given color. Performing such calibrations may increase the color accuracy of the calibrated color output device.

While the invention has been particularly shown and described with reference to the foregoing preferred embodiments, those skilled in the art will understand that many variations may be made therein without departing from the spirit and scope of the invention as defined in the following claims. The description of the invention should be understood to include all novel and nonobvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

What is claimed is:

1. A method of detecting color miscalibration in a color output device, the method comprising:
providing a calibration mask having a target color and a plurality of windows;
outputting a test array that includes blending a plurality of constituent colors in scaled combinations to yield a plurality of test samples having varied associated test colors, the test samples being arranged for viewing through the windows of the calibration mask, each test sample having an associated test color;
aligning the windows of the calibration mask with the test array so that the target color of the calibration mask at least partially frames at least one of the test samples; and
comparing the target color of the calibration mask to the test colors of the framed test samples to detect color miscalibration.

2. The method of claim 1, wherein outputting the test array includes printing the test array.

3. A method of detecting color miscalibration in a color output device, the method comprising:
providing the calibration mask by blending substantially equal portions of a plurality of constituent colors to yield a neutral target color, the calibration mask having a plurality of windows;
outputting a test array that includes a plurality of test samples arranged for viewing through the windows of the calibration mask, each test sample having an associated test color;
aligning the windows of the calibration mask with the test array so that the target color of the calibration mask at least partially frames at least one of the test samples; and
comparing the target color of the calibration mask to the test colors of the framed test samples to detect color miscalibration.

4. A method of color-calibrating a printer, the method comprising:
providing a calibration mask having a target color and a plurality of windows;
printing a test array that includes a plurality of test samples arranged for viewing through the windows of the calibration mask, each test sample having an associated test color and an associated color-adjustment factor, wherein printing the test array includes blending a plurality of constituent colors to yield each associated test color;
aligning the windows of the calibration mask with the test array so that the target color of the calibration mask at least partially frames at least one of the test samples; and
comparing the target color of the calibration mask to the test colors of the framed test samples;
selecting the test sample with the test color most closely matching the target color of the calibration mask; and
adjusting calibration of the printer based on the color-adjustment factor of the selected test sample.

5. The method of claim 4, wherein providing the calibration mask includes blending substantially equal portions of a plurality of constituent colors to yield a neutral target color.

6. The method of claim 4, wherein outputting the test array includes scaling the test color of each test sample relative to other test samples.

7. The method of claim 6, wherein at least one of the test samples has a presumed-neutral test color, and at least one other test sample has a test color scaled relative to the presumed-neutral test color.

8. The method of claim 4, wherein outputting the test array includes arranging the test samples in a two-dimensional array.

9. The method of claim 8, wherein outputting the test array includes varying the respective test colors of the test samples by varying an amount of a first constituent color across a first dimension of the two-dimensional array, and varying an amount of a second constituent color across a second dimension of the two-dimensional array.

10. The method of claim 4, wherein adjusting calibration includes modifying a color conversion table by the color-adjustment factor of the selected test sample.

11. The method of claim 10, wherein modifying the color conversion table includes interpolating an adjustment made to a portion of the color conversion table to other portions of the color conversion table.

12. The method of claim 10, wherein modifying the color conversion table includes adjusting a color-output value of at least one constituent color.

13. A calibration mask comprising:
a sheet having a neutral target color, the neutral target color being configured to provide a color-comparison reference for a plurality of test samples, each test sample having an associated test color, and
a plurality of windows defined by the sheet, wherein the plurality of windows are arranged to align with a test array, the plurality of windows being configured to frame test samples of the test array.

14. The calibration mask of claim 13, wherein the sheet is less than approximately 0.6 millimeters thick.

15. The calibration mask of claim 14, wherein the sheet is between approximately 0.2 millimeters and approximately 0.55 millimeters thick.

16. The calibration mask of claim 13, wherein the plurality of windows are arranged in a two-dimensional array.

17. The calibration mask of claim 16, wherein the two-dimensional array includes rows and columns.

18. The calibration mask of claim 13, wherein at least one of the windows is a rectangular window.

19. The calibration mask of claim 13, wherein at least one of the windows is a circular window.

20. The calibration mask of claim 13, wherein the target color has a long light fastness.

21. The calibration mask of claim 13, wherein the target color is substantially free of metamerism relative to the test colors of the test samples.

22. A calibration mask comprising;
a sheet means having a target color printed thereon, the target color being formed of substantially equal portions of a plurality of constituent colors blended to yield a neutral target color and being configured to provide a color-comparison reference for a plurality of test samples, each test sample having an associated test color, and
a window means defined by the sheet means, the window means being configured to align with a test array and to frame one or more test samples of the test array with the target color.

23. A color calibration system comprising:
a presentation medium configured to receive a test array of test samples having associated test colors; and
a calibration mask of a neutral target color having a plurality of windows arranged to align with the test array and frame test samples of the test array;
wherein the target color substantially covers the calibration mask to frame the plurality of windows and to provide a color-comparison reference for the test colors of the test samples.

24. The color calibration system of claim 23, wherein the calibration mask and the presentation medium are made of a common material.

25. The color calibration system of claim 23, wherein the target color of the calibration mask and the test colors of the test array are printed with a common type of ink.

26. The color calibration system of claim 23, wherein the target color of the calibration mask and the test colors of the test array are printed with a common type of toner.

* * * * *